(12) United States Patent
Takao

(10) Patent No.: US 7,333,278 B2
(45) Date of Patent: Feb. 19, 2008

(54) MANUFACTURING METHOD OF COLOR WHEEL, AND COLOR WHEEL FABRICATED THEREBY AND INCORPORATED IN COLOR WHEEL ASSEMBLY AND IMAGE DISPLAY APPARATUS

(75) Inventor: Kuniyuki Takao, Iwata-gun (JP)

(73) Assignee: Minebea Co., Ltd., Kitasaku (JP)

( * ) Notice: Subject to any disclaimer, the term of this patent is extended or adjusted under 35 U.S.C. 154(b) by 828 days.

(21) Appl. No.: 10/829,161

(22) Filed: Apr. 22, 2004

(65) Prior Publication Data

US 2004/0246218 A1 Dec. 9, 2004

(30) Foreign Application Priority Data

Jun. 5, 2003 (JP) .............................. 2003-160612

(51) Int. Cl.
*G02B 5/22* (2006.01)
(52) U.S. Cl. ....................................... 359/891; 359/900
(58) Field of Classification Search ................. 359/891
See application file for complete search history.

(56) References Cited

U.S. PATENT DOCUMENTS

| | | | |
|---|---|---|---|
| 4,800,474 A | 1/1989 | Bornhorst | |
| 5,257,332 A | 10/1993 | Pimpinella | |
| 5,711,889 A * | 1/1998 | Buchsbaum | 216/5 |
| 5,868,482 A | 2/1999 | Edlinger et al. | |
| 6,011,662 A | 1/2000 | Evans | |
| 6,024,453 A | 2/2000 | Edlinger et al. | |
| 6,238,583 B1 * | 5/2001 | Edlinger et al. | 216/24 |
| 6,574,046 B1 | 6/2003 | Shioya | |
| 6,702,446 B2 | 3/2004 | De Vaan et al. | |
| 6,715,887 B2 | 4/2004 | Chang | |
| 6,813,087 B2 | 11/2004 | Davis | |
| 7,056,630 B2 * | 6/2006 | Kamei et al. | 430/7 |
| 7,190,536 B2 * | 3/2007 | Jiang et al. | 359/891 |
| 2002/0005914 A1 | 1/2002 | Tew | |
| 2002/0105729 A1 | 8/2002 | Richards et al. | |
| 2003/0142241 A1 | 7/2003 | Allen et al. | |
| 2004/0038137 A1 * | 2/2004 | Chang et al. | 430/7 |
| 2004/0095767 A1 | 5/2004 | Ohmae et al. | |
| 2005/0018145 A1 | 1/2005 | Kwon et al. | |

FOREIGN PATENT DOCUMENTS

| | | |
|---|---|---|
| JP | A-03-122903 | 5/1991 |
| JP | A-04-282893 | 10/1992 |
| JP | A 5-90391 | 4/1993 |

(Continued)

*Primary Examiner*—Stephone B. Allen
*Assistant Examiner*—Jade Callaway
(74) *Attorney, Agent, or Firm*—Oliff & Berridge, PLC

(57) ABSTRACT

A method of manufacturing a color wheel with filter sectors. A resist film formed on a disk-like substrate of the color wheel is shaped into a mask pattern by photo processing, a metal mask which has openings configured similar to the filter sectors but having a slightly larger area than those is set on the substrate, and optical interference filters of a dielectric multi-layer film are formed by an evaporation method or a sputtering method, whereby the optical interference filters are formed so as to cover very limited portions of the mask pattern so that at lift-off process, resist remover can penetrate into the mask pattern from most portions of the mask pattern thus enabling the mask pattern to be removed easily and quickly.

12 Claims, 18 Drawing Sheets

FOREIGN PATENT DOCUMENTS

| | | |
|---|---|---|
| JP | A-06-347639 | 12/1994 |
| JP | A-10-048542 | 2/1998 |
| JP | A-11-115711 | 4/1999 |
| JP | A-11-222664 | 8/1999 |
| JP | A-2000-239830 | 9/2000 |
| JP | A-2001-073136 | 3/2001 |
| JP | A-2003-050309 | 2/2003 |
| JP | A 2003-57424 | 2/2003 |
| JP | A-2004-101827 | 4/2004 |
| JP | 2005062319 A * | 3/2005 |
| WO | WO 94/25796 A1 | 11/1994 |

* cited by examiner

MANUFACTURING METHOD OF COLOR WHEEL, AND COLOR WHEEL FABRICATED THEREBY AND INCORPORATED IN COLOR WHEEL ASSEMBLY AND IMAGE DISPLAY APPARATUS

BACKGROUND OF THE INVENTION

1. Field of the Invention

The present invention relates to a manufacturing method of a color wheel suitable for use as a filter element of a time-share light dispersing device, and to a color wheel fabricated by the manufacturing method and incorporated in a color wheel assembly making up a projection-type image display apparatus.

2. Description of the Related Art

Color composition in a projection-type image display apparatus has conventionally been accomplished commonly by a method, such as: a single-panel method, in which one light valve element adapted to control light amount per pixel thereby creating an image is used to disperse each pixel into R (red), G (green), and B (blue) lights; and a three-panel method, in which three light valve elements dedicated to R, G and B lights, respectively, are used to produce in parallel R, G and B images, and then the three images thus produced are composed. Recently, as a light valve element capable of fast switching, such as a ferroelectric liquid crystal display element or a digital micro mirror device, is increasingly coming into practical use, a time-sharing single-panel method is widely used. In the time-sharing single-panel method, R, G and B lights are caused to sequentially impinge on one light valve element, the light valve element is driven in synchronization with switching-over of the R, G and B lights thereby producing R, G and B images in a time-series manner, and the images thus produced are projected onto a screen, or the like. Here, color composition of the images is accomplished by a viewer due to an afterimage effect occurring at a sense of vision. In the time-sharing single-panel method, reduction in both dimension and weight of the apparatus, which is a feature of a single-panel method, can be achieved by employing a relatively simple optical system, and therefore the time-sharing single-panel method is favorable for realizing inexpensive fabrication of a projection-type image display apparatus. In such an image display apparatus, a color wheel is preferably used as a filter element of a time-share light dispersing device to sequentially disperse light emitted from a white light source into R, G and B lights having respective wavelength bands in a time-sharing manner.

FIGS. 18A and 18B are respectively front and side views of a typical color wheel assembly 200 provided with such a color wheel. Referring to FIG. 18B, the color wheel assembly 200 comprises a color wheel 100, a hub 105, and a motor 106. The color wheel 100 is a tricolor color wheel composed of a disk-like substrate 101 which is made of a light-transmitting material, for example, optical glass, and three filter sectors 102, 103 and 104 which are formed on a surface of the substrate 101, and which transmit exclusively, for example, R, G and B lights, respectively. The color wheel 100 thus structured is fixedly attached to the motor 106 via the hub 105 coaxially therewith. The color wheel assembly 200 operates such that the color wheel 100 is rotated by the motor 106 so that the filter sectors (R, G and B) 102, 103 and 104 sequentially have white light S falling incident thereon whereby the white light S is sequentially dispersed into R, G and B lights.

The filter sectors 102, 103 and 104 are usually constituted by optical interference filters of a dielectric multi-layer film structured such that a dielectric thin film formed of a material having a high refractive index (e.g., $TiO_2$, $ZrO_2$, and ZnS), and a dielectric thin film formed of a material having a low refractive index (e.g., $SiO_2$, and $MgF_2$) are alternately laminated by an evaporation method, a sputtering method, or the like. The optical interference filter is superior in durability (heat resistance, light stability, and chemical resistance) to a color filter formed by a staining method, a pigment dispersion method, or the like, has a high transmittance, and easily achieves a sharp spectroscopic characteristic, and therefore endures exposure to intensive light flux and produces a display image of a high visual quality.

A so-called lift-off method is one method for forming such a dielectric multi-layer film with its film formation region precisely demarcated. In the lift-off method, a mask pattern, which is made of a resist film or a metal thin film such that only a predetermined film formation region is exposed, is first formed on a substrate using a prescribed photo processing, and a plating processing as required, then a thin film is formed entirely over the mask pattern, and the mask pattern is fused to be removed thereby lifting off the thin film formed on the mask pattern, thus retaining the thin film only at the predetermined film formation region. This method allows a dielectric multi-layer film to be formed while a film formation region is precisely demarcated by a photo processing without using a troublesome etching processing on a dielectric multi-layer film.

However, the following two problems are found in using the above-described lift-off method for fabricating a color wheel.

Firstly, unlike semiconductor fabrication in which a minute pattern is formed on a substrate, a region to be lifted off has a large area. Specifically, in case of the aforementioned color wheel 100 shown in FIG. 18A, for example when forming the filter sector 102, a region corresponding to a region continuously covered by the filter sectors 103 and 104 is to be lifted off. In this case, since a dielectric multi-layer film is formed also on the entire surface of a mask pattern, resist removing or etching liquid for removing the mask pattern is allowed to effectively penetrate into the mask pattern only from the sidewalls of the pattern mask, which define the outer circumferences of the region continuously covered by the filter sectors 103 and 104, and which usually have a thickness of μm order thus providing an extremely small area as compared to the area of the region to be lifted off. Consequently, an increased time is required for the resist removing or etching liquid to penetrate into the lift-off region and to remove the mask pattern completely, and also it can happen that the mask pattern film once stripped off adheres back to the substrate during the increased time. This leads to deterioration in both working efficiency and product quality. And, in case of a mask pattern made of a resist film, since the resist film is denatured by heat, plasma or ion irradiation during the film formation process, the removing work is made further difficult, which may result in requiring, in addition to the aforementioned increased time, a process performed at a high temperature, or a special treatment, such as high-pressure spraying, ultrasonication, and the like.

Secondly, in the case of color wheel fabrication, since the dimension of a color wheel is determined by the dimension of a substrate, the substrate is minimized for the purpose of downsizing the color wheel, and therefore filter sectors, which are desired to have a maximum possible area, are usually formed fully up to the very periphery of the minimized substrate. The case is different for semiconductor fabrication, where a substrate, which is to be finally cut for yielding plural elements, is so structured as to include at its periphery a blank area with no elements formed, and the blank area is used for holding the substrate inside a film forming apparatus during the film formation process (refer to, for example, Japanese Patent Application Laid-Open No. H05-90391). On the other hand, in the color wheel fabrication, the substrate has no blank area as described above, and it is difficult to hold the substrate inside a film formation apparatus.

Under the circumstances described above, for the purpose of demarcating the filter sectors, the color wheel has conventionally been often fabricated by using a masking jig made of, for example, a thin metal plate (hereinafter referred to as "metal mask") as disclosed in, for example, Japanese Patent Application Laid-Open No. 2003-57424. In the color wheel fabrication, while minute patterning is not required for forming any of filter sectors, two adjacent filter sectors must abut each other precisely in order to prevent light, which passes a boundary between the two adjacent filter sectors, from failing to determine its color only to become unutilized for image formation. In this regard, the demarcation accomplished by means of a metal mask, in which alignment is principally performed mechanically and secondarily performed visually, is limited in alignment accuracy, and is not capable of achieving the degree of accuracy that is achieved by a photo processing technique used for forming a mask pattern in a lift-off method.

SUMMARY OF THE INVENTION

The present invention has been made in light of the above problems, and it is an object of the present invention to provide a manufacturing method of a color wheel which uses a lift-off method thereby easily forming filter sectors, and to provide a color wheel which is fabricated by the manufacturing method, and which is incorporated in a color wheel assembly and an image display apparatus.

In order to achieve the object, according to a first aspect of the present invention, a color wheel, which comprises a disk-like substrate made of a light-transmittable material, and plural kinds of filter sectors formed on the substrate and functioning either to selectively transmit or selectively reflect lights having respective different wavelength bands, is fabricated by a manufacturing method which comprises the steps of: forming, on the substrate, a mask pattern to demarcate predetermined filter sectors of a kind functioning to either transmit or reflect light having a specific wavelength band; setting, over the substrate having the mask pattern formed thereon, a masking jig which has openings dimensioned slightly larger than the predetermined filter sectors; forming, on the substrate with the masking jig set thereon, predetermined filters to constitute the predetermined filter sectors; taking off the masking jig from the substrate having the predetermined filters formed thereon; and removing the mask pattern from the substrate with the masking jig taken off therefrom. Since when the filters are formed, the masking jig is set over the substrate which has its surface covered by the mask pattern for demarcating the filter sectors, the filters are not formed at the regions of the mask pattern to be lifted off, and also the mask pattern is protected by the masking jig against heat, or plasma or ion irradiation. Consequently, the mask pattern can be easily and quickly removed, and the filter sectors can be precisely demarcated by the mask pattern formed on the substrate without relying on positioning of the masking jig.

In the first aspect of the present invention, the step of forming a mask pattern may include: applying photo resist onto the substrate thereby forming a resist film; and shaping the resist film into a negative pattern configured such that the substrate is exposed at regions corresponding to the predetermined filter sectors. Since the mask pattern is formed of photo resist, the filter sectors can be precisely demarcated by photo processing.

In the first aspect of the present invention, the step of forming a mask pattern may include: forming an electrically conductive thin film on the substrate; applying photo resist onto the electrically conductive thin film thereby forming a resist film; shaping the resist film into a positive pattern configured such that the electrically conductive thin film formed on the substrate is exposed except at regions corresponding to the predetermined filter sectors; forming a plating layer on exposed portions of the electrically conductive thin film by an electroplating process conducted by leveraging the electrically conductive thin film as an electrode; removing the resist film; and removing the electrically conductive thin film formed at the regions corresponding to the predetermined filter sectors. Since the mask pattern is formed using a plating layer of metal film after the filter sectors are demarcated by photo processing, the filter sectors can be precisely demarcated, and at the same time the mask pattern can be excellent in heat resistance and degasification even if the substrate must be heated or high vacuum is required when forming the filters.

In the first aspect of the present invention, the step of forming the predetermined filters may include forming dielectric multi-layer films, and the masking jig may be fixed to a dielectric multi-layer film forming apparatus whereby the substrate, together with the masking jig, is held inside the apparatus. Since the filter sectors are constituted by optical interference filters formed of a dielectric multi-layer film, the color wheel fabricated is excellent in durability (heat resistance, light stability, and chemical resistance), has a high transmittance, and easily achieves a sharp spectroscopic characteristic. Further, the substrate can be readily and conveniently held inside the film forming apparatus without using a special mechanism for holding the substrate itself even when the filters are formed up to the very periphery of the substrate.

According to a second aspect of the present invention, a color wheel comprises a disk-like substrate made of a light-transmittable material, and plural kinds of filter sectors formed on the substrate and each kind thereof functioning to either transmit or reflect light having a specific wavelength band, and the filter sectors of the color wheel are formed by one of the methods according to the first aspect of the present invention. Since the filter sectors are precisely demarcated by the mask pattern formed on the substrate thereby precisely aligning adjacent filter sectors, light falling incident on the boundary between the adjacent filter sectors is prevented from failing to determine its color so as to be only wasted.

In the second aspect of the present invention, the color wheel, together with a motor for rotating the color wheel, may compose a color wheel assembly. Since the filter sectors are accurately demarcated to be aligned to one another precisely, white light entering the color wheel can be efficiently utilized thereby achieving reduction in power consumption. Also, since the filter sectors are formed fully up to the very periphery of the substrate, the substrate can be minimized thereby downsizing the color wheel, resulting in that the color wheel assembly including the color wheel can be downsized.

In the second aspect of the present invention, the color wheel assembly incorporating the color wheel may be employed in an image display apparatus. Since the image display apparatus employs the color wheel assembly adapted to efficiently utilize white light, a display image of a high visual quality can be achieved.

DESCRIPTION OF THE PREFERRED EMBODIMENTS

Figure 1:
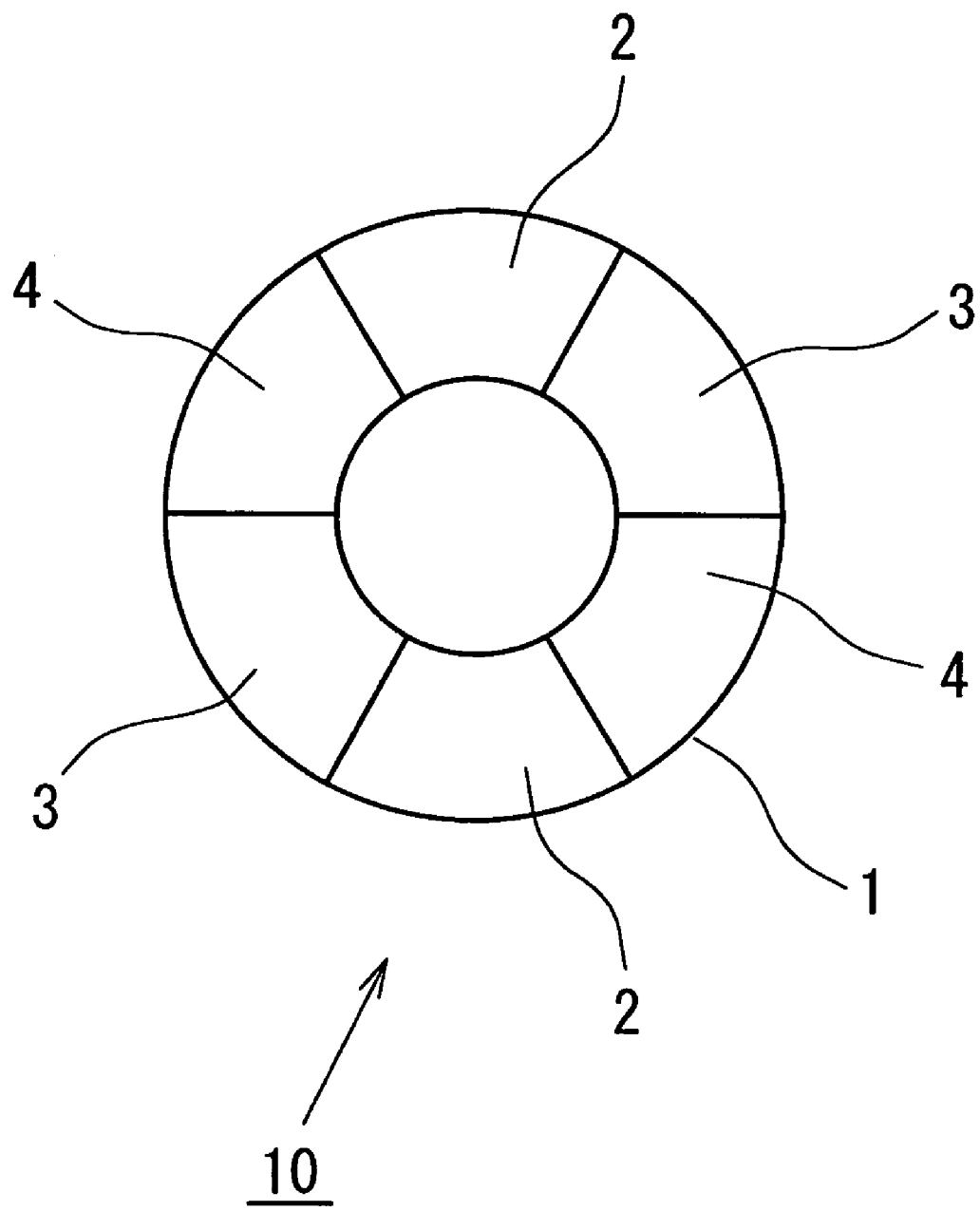
FIG. 1 is a plan view of a color wheel fabricated by one of manufacturing methods according to the present invention.

The present invention will hereinafter be described with reference to the accompanying drawings. FIG. 1 shows a color wheel 10, which is fabricated according to one of manufacturing methods to be discussed. The color wheel 10 of the present invention is structured such that filter sectors 2, 3 and 4 are formed on a disk-like substrate 1 made of a light-transmittable material, such as glass, resin, and the like. The filter sectors 2, 3 and 4 are well-known optical interference filters which are composed of a dielectric multilayer film formed by an evaporation method, a sputtering method, or the like. The filter sectors 2 are R (red) transmitting filters to transmit R light only, the filter sectors 3 are G (green) transmitting filters to transmit G light only, and the filter sectors 4 are B (blue) transmitting filters to transmit B light only. The light-transmittable material for the substrate 1 may preferably be, for example, optical glass such as borosilicic acid glass, or optical plastic such as polymethyl methacrylate, polycarbonate, and polycyclic olefin.

In the discussion of a color wheel to follow below, each filter sector is adapted to transmit light with a given wavelength band only thereby performing its filter function, but the present invention is not limited thereto and includes a color wheel in which each filter sector performs its filter function by reflecting light with a given wavelength band only.

Figure 2A:
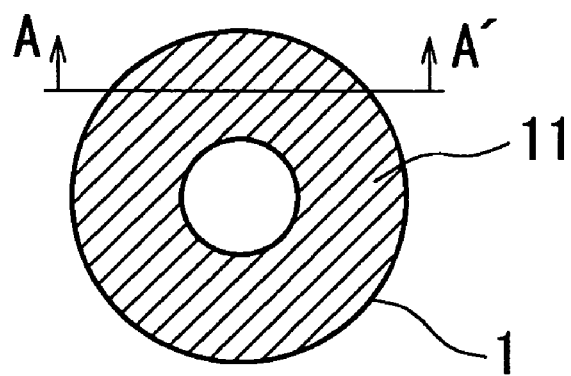
FIG. 2A is a plan view of the color wheel at a process where a resist film is formed on a substrate in a manufacturing method according to a first embodiment of the present invention.
Figure 2B:
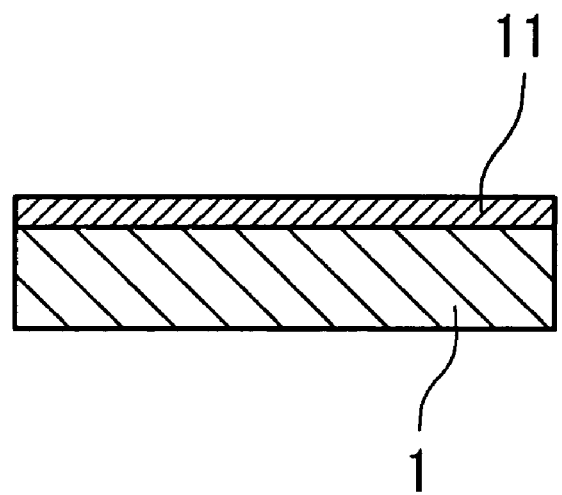
FIG. 2B is a cross-sectional view thereof taken at a line A-A' in FIG. 2A.
Figure 3A:
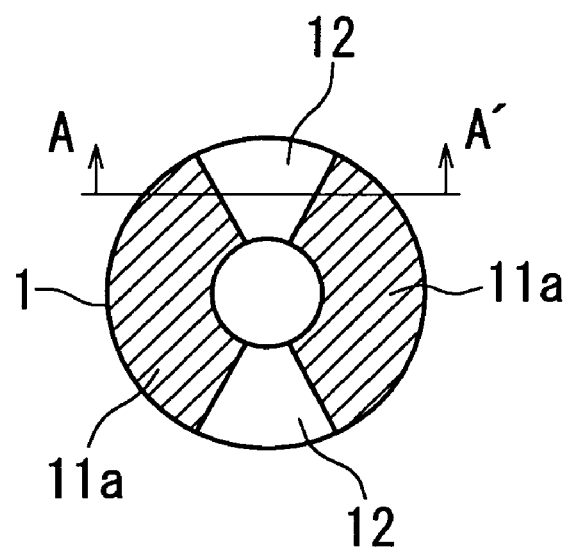
FIG. 3A is a plan view of the color wheel at a process where a mask pattern is shaped in the manufacturing method according to the first embodiment.
Figure 3B:
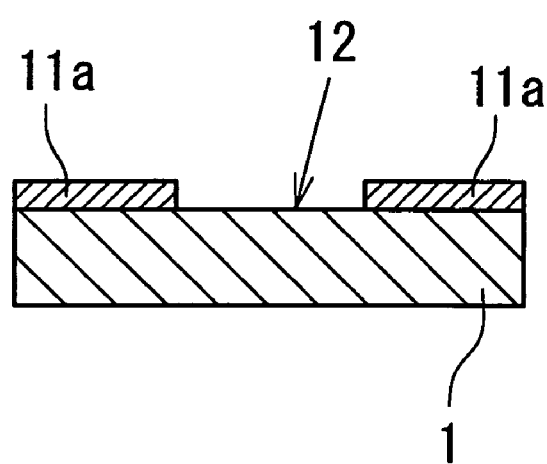
FIG. 3B is a cross-sectional view thereof taken at a line A-A' in FIG. 3A.

A first embodiment of a method for manufacturing the color wheel 10 shown in FIG. 1 will now be discussed with reference to FIGS. 2A, 2B to 7A, 7B, in which processes of the method are explained using examples from the filter sectors 2 as the R transmitting filters. Referring first to FIGS. 2A and 2B, photo resist is applied entirely on the substrate 1 by, for example, a spin coat method thus forming a resist film 11 on the substrate 1. Then, a series of photo-processing steps, such as exposing and developing, are performed for patterning the resist film 11 such that the substrate 1 is exposed at film formation regions 12 corresponding to the filter sectors 2 while masked at the rest of regions where portions (hereinafter referred to as "mask pattern films") 11a of the resist film 11 remain intact, as shown in FIGS. 3A and 3B, thus a mask pattern (negative pattern) composed of the mask pattern films 11a is shaped.

Figure 4A:
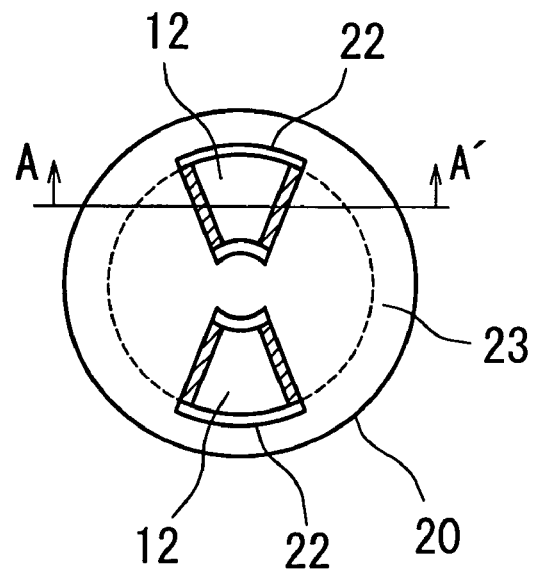
FIG. 4A is a plan view of the color wheel at a process where a metal mask is set in the manufacturing method according to the first embodiment.
Figure 4B:
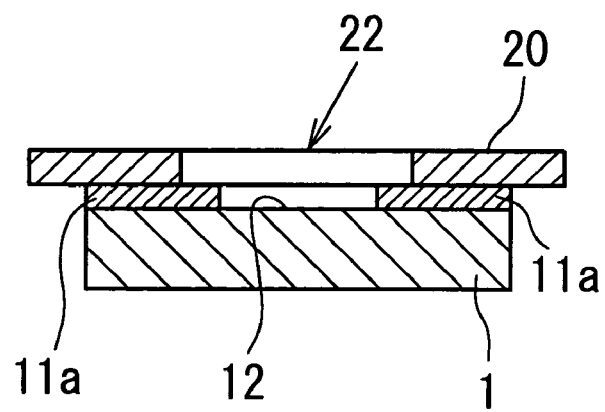
FIG. 4B is a cross-sectional view thereof taken at a line A-A' in FIG. 4A.

Referring now to FIGS. 4A and 4B, a metal mask 20 as a masking jig, which is shaped disk-like, and which has openings 22 configured similar to the film formation regions 12 but having a slightly larger area than those, is set on the substrate 1 with the openings 22 aligned to the film formation regions 12. The metal mask 20 has a larger diameter than the substrate 1 so as to have an outer circumferential portion 23 thereof sticking out from the periphery of the substrate 1, and the substrate 1 can be held inside a film forming apparatus (not shown) in such a manner that the outer circumferential portion 23 of the metal mask 20 is fixed to a retention mechanism of the film forming apparatus by a locking means, such as screwing.

Figure 5A:
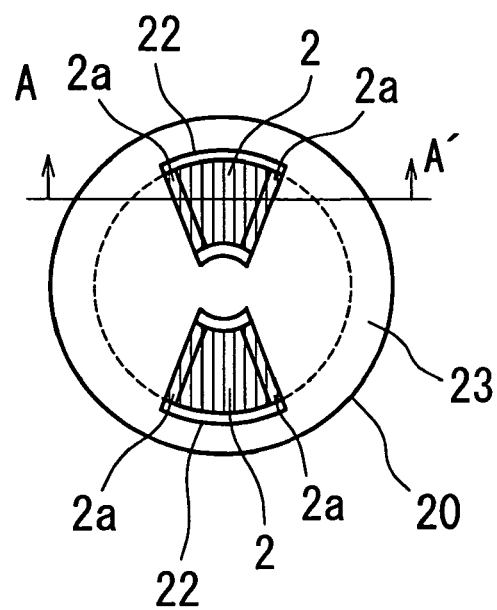
FIG. 5A is a plan view of the color wheel at a process where filters are formed in the manufacturing method according to the first embodiment.
Figure 5B:
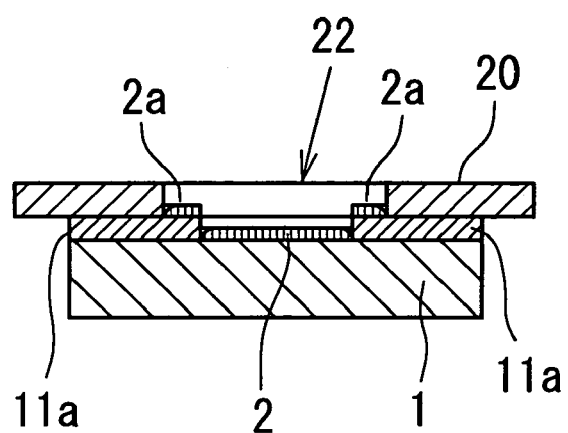
FIG. 5B is a cross-sectional view thereof taken at a line A-A' in FIG. 5A.
Figure 6A:
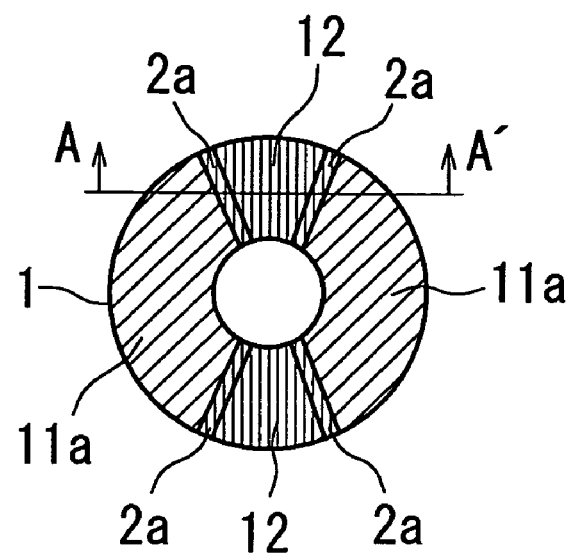
FIG. 6A is a plan view of the color wheel at a process where the metal mask is taken off in the manufacturing method according to the first embodiment.
Figure 6B:
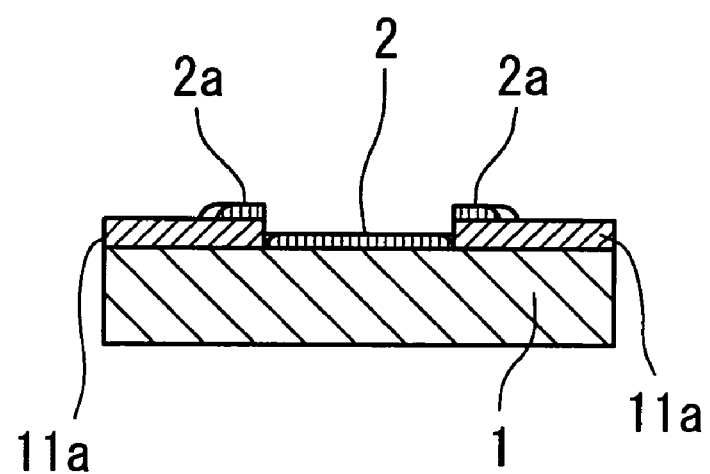
FIG. 6B is a cross-sectional view thereof taken at a line A-A' in FIG. 6A.
Figure 7A:
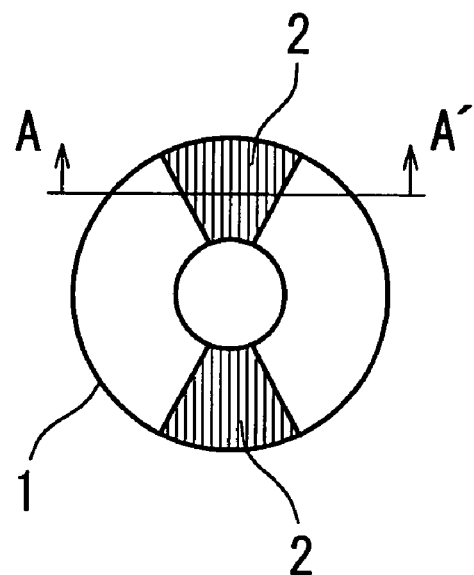
FIG. 7A is a plan view of the color wheel at a process where the resist film constituting the mask pattern is removed in the manufacturing method according to the first embodiment.
Figure 7B:
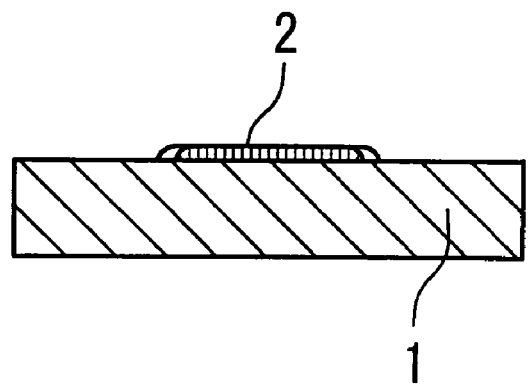
FIG. 7B is a cross-sectional view thereof taken at a line A-A' in FIG. 7A.

Referring then to FIGS. 5A and 5B, predetermined dielectric multi-layer films are formed by an evaporation method or a sputtering method, thus (R transmitting) filter sectors 2 are formed entirely at respective film formation regions 12 of the substrate 1, and filters 2a are formed partly on the mask pattern films 11a. Then, the metal mask 20 is taken off (refer to FIGS. 6A and 6B), and resist remover composed of a mixed solution containing organic alkaline and organic solvent is applied to the substrate 1 thereby dissolving and removing the mask pattern films 11a of the mask pattern. At this process, the filters 2a formed on the mask pattern films 11a are lifted off while the filter sectors 2 remain in place on the substrate 1 as shown in FIGS. 7A and 7B.

The above-described process for forming the filter sectors 2 is performed for achieving each of the filter sectors 3 and 4, and the color wheel 10 is completed.

In the first embodiment described above, since dielectric multi-layer film formation is performed with the metal mask 20 placed on the substrate 1, dielectric multi-layer films are formed only at regions exposed through the openings 22 of the metal mask 20 and therefore formed at very limited portions of the mask pattern films 11a bordering on the film formation regions 12 (in this connection, dielectric multi-layer films formed on the metal mask 20 are omitted in FIGS. 5A and 5B). Consequently, in the process of removing the mask pattern films 11a, resist remover penetrates into the mask pattern films 11a not only from the sidewall portions thereof but also from the most area of the top surfaces thereof thus better dissolving the resist forming the mask pattern films 11a. Further, since the mask pattern films 11a are protected by the metal mask 20 against heat of evaporated substance, plasma or ion irradiation, the resist of the mask pattern films 11a suffers reduced denaturation thus alleviating development of the difficulty in dissolving the mask pattern films 11a.

The thickness of the mask pattern films 11a falls preferably within a range with a lower limit set to such a degree that the dielectric multi-layer films (filter sectors 2) formed at the film formation regions 12 are separated from the dielectric multi-layer films formed on the mask pattern films 11a, and with an upper limit set to such a degree that the entrance of particles from an evaporating source is not restricted so much as to cause remarkable disturbance in forming a uniform film at the periphery of the film formation regions 12. Specifically, the thickness of the mask pattern films 11a is usually set to measure at about 2 to 10 times the thickness (ranging 1 to 4 μm) of the films constituting the filter sectors 2. The thickness of the mask pattern films 11a, for example when resist is applied by a spin coat method, can be controlled by adjusting the viscosity of the resist, the rotation speed and the number of application, and the like.

A second embodiment of a method for manufacturing the color wheel 10 shown in FIG. 1 will be described with reference to FIGS. 8A, 8B to 15A. 15B, in which processes of the method are shown using examples from the filter sectors 2 as the R transmitting filters. In explaining FIGS. 8A, 8B to 15A, 15B, any parts corresponding to those in FIGS. 2A, 2B to 7A, 7B are denoted by the same reference numerals.

Figure 8A:
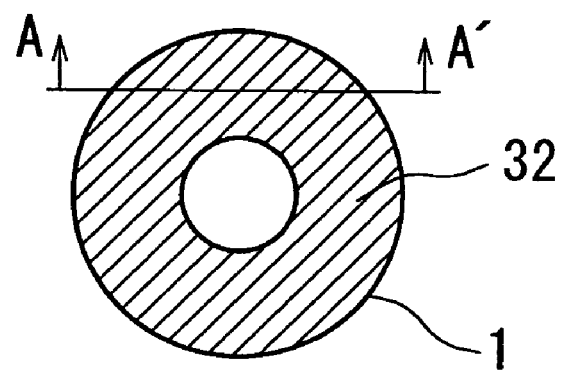
FIG. 8A is a plan view of the color wheel at a process where a chrome thin film and a resist film are formed on a substrate in a manufacturing method according to a second embodiment of the present invention.
Figure 8B:
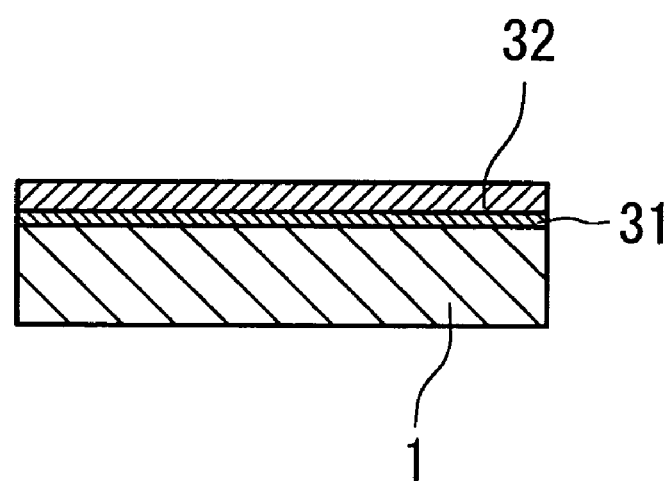
FIG. 8B is a cross-sectional view thereof taken at a line A-A' in FIG. 8A.
Figure 9A:
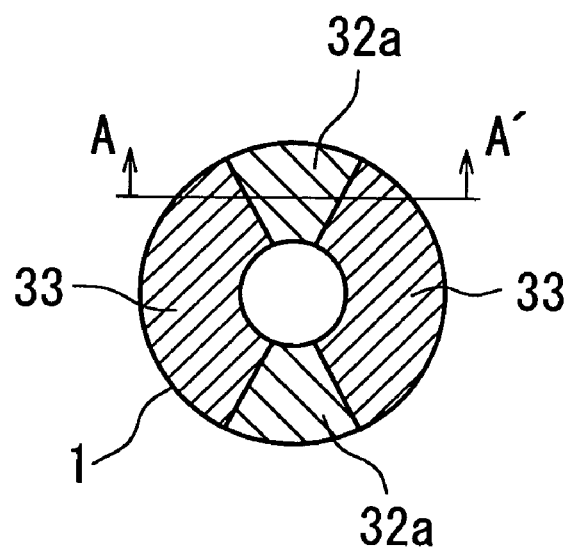
FIG. 9A is a plan view of the color wheel at a process where a positive pattern film is shaped in the manufacturing method according to the second embodiment.
Figure 9B:
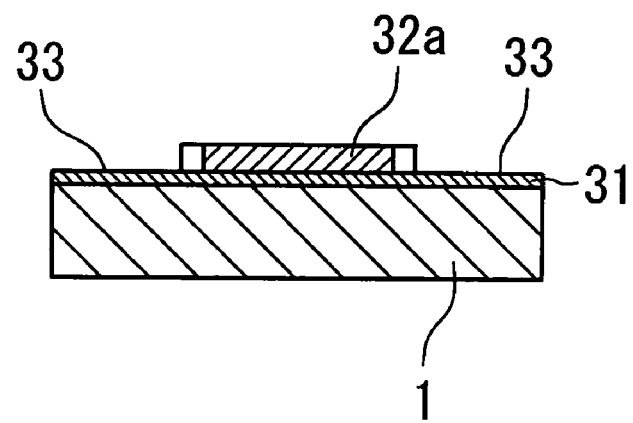
FIG. 9B is a cross-sectional view thereof taken at a line A-A' in FIG. 9A.

Referring to FIGS. 8A and 8B, an electrically conductive thin film 31 of, for example, chrome (Cr) (hereinafter referred to as "chrome thin film" as appropriate) is first formed entirely on the substrate 1 by, for example, an evaporation method, and photo resist is applied entirely on the chrome thin film 31 by, for example, a spin coat method thus forming a resist film 32 on the chrome thin film 31. Then, a series of photo-processing steps, such as exposing and developing, are performed for patterning the resist film 32 such that the chrome thin film 31 is exposed at regions 33 while covered at the rest of regions where portions (hereinafter referred to as "positive pattern films") 32a of the resist film 32 remain intact, which correspond to respective filter sectors 2 (refer to FIGS. 9A and 9B).

Figure 10A:
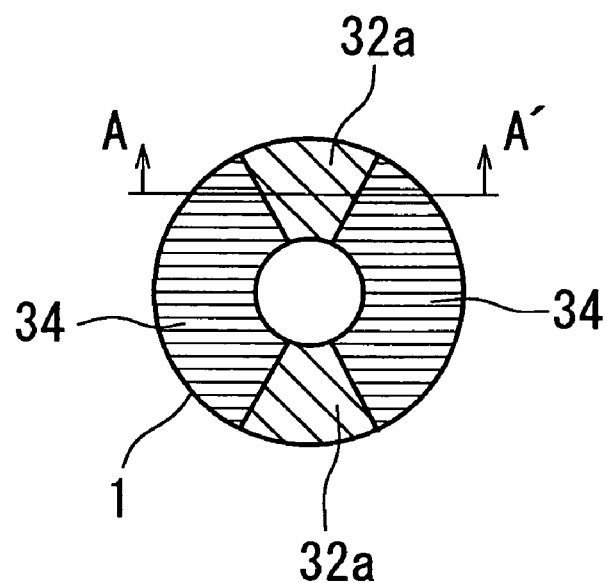
FIG. 10A is a plan view of the color wheel at a process where a plating layer is formed in the manufacturing method according to the second embodiment.
Figure 10B:
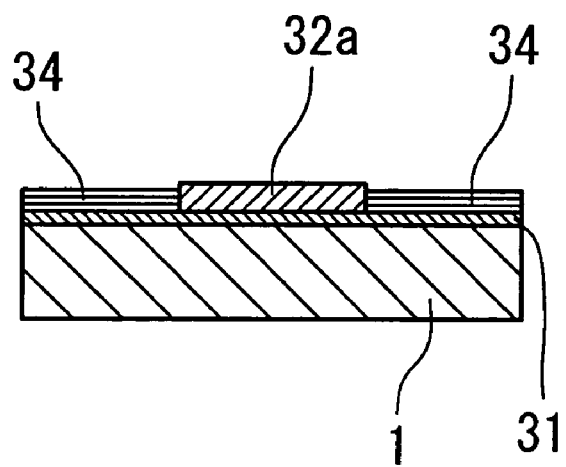
FIG. 10B is a cross-sectional view thereof taken at a line A-A' in FIG. 10A.
Figure 11A:
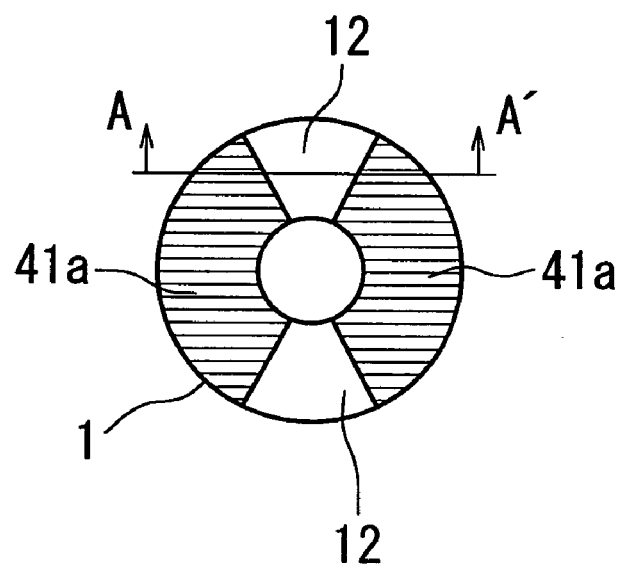
FIG. 11A is a plan view of the color wheel at a process where the chrome thin film and the resist film constituting the positive pattern film is removed thereby shaping a mask pattern in the manufacturing method according to the second embodiment.
Figure 11B:
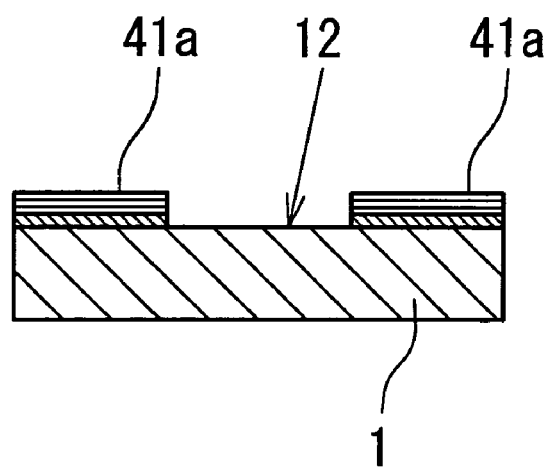
FIG. 11B is a cross-sectional view thereof taken at a line A-A' in FIG. 11A.

Referring now to FIGS. 10A and 10B, copper (Cu) plating layers 34 are separated out by, for example, copper sulfate electrolytic plating at the regions 33 (refer to FIGS. 9A and 9B) where the chrome thin film 31 is exposed. Then, the positive pattern films 32a are removed by resist remover composed of a mixed solution containing organic alkaline and organic solvent whereby the chrome thin film 31 is exposed, and the chrome thin film 31 exposed is wet-etched for removal by, for example, an ammonium cerium (II) nitrate-based etching solution, which leaves portions (hereinafter referred to as "mask pattern films") 41a only on the substrate 1. Thus, a mask pattern (negative pattern) is shaped such that the substrate 1 is exposed at film formation regions 12 while masked at the rest of regions by the mask pattern films 41a formed of the copper plating layers 34 (refer to FIG. 10B), as shown in FIGS. 11A and 11B. In this connection, even if the aforementioned resist remover corrodes the copper plating layer 34, the copper plating layer 34 duly functions as a masking means because the copper plating layer 34 is formed to have a sufficiently larger thickness than the chrome thin film 31 so that the chrome thin film 31 is sure to be removed first.

Figure 12A:
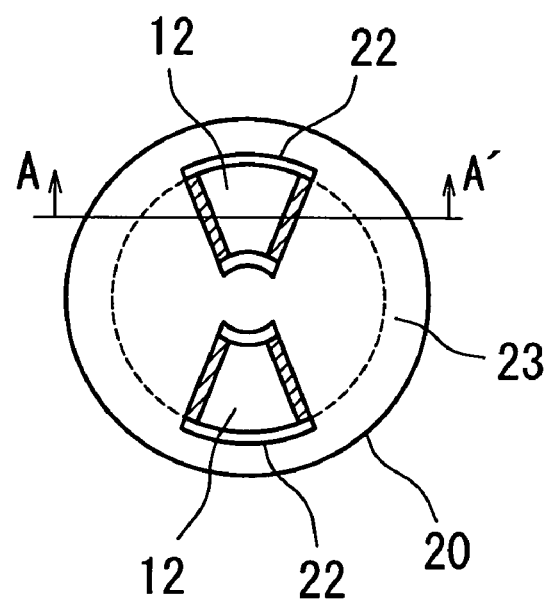
FIG. 12A is a plan view of the color wheel at a process where a metal mask is set in the manufacturing method according to the second embodiment.
Figure 12B:
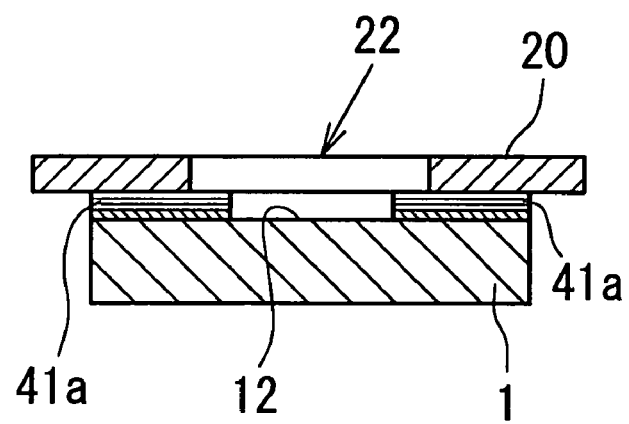
FIG. 12B is a cross-sectional view thereof taken at a line A-A' in FIG. 12A.

Referring to FIGS. 12A and 12B, a metal mask 20 as masking jig, which is shaped disk-like, and which has openings 22 configured similar to the film formation regions 12 but having a slightly larger area than those, is set on the substrate 1 with the openings 22 aligned to the film formation regions 22. The metal mask 20 has a larger diameter than the substrate 1 so as to have an outer circumferential portion 23 thereof sticking out from the periphery of the substrate 1. The substrate 1 can be held inside a film forming apparatus (not shown) in such a manner that the outer circumferential portion 23 of the metal mask 20 is fixed to a retention mechanism of the film forming apparatus by a locking means, such as screwing.

Figure 13A:
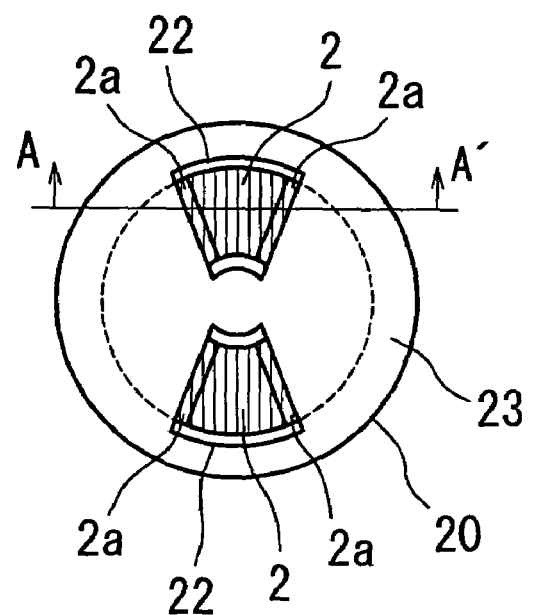
FIG. 13A is a plan view of the color wheel at a process where filters are formed in the manufacturing method according to the second embodiment.
Figure 13B:
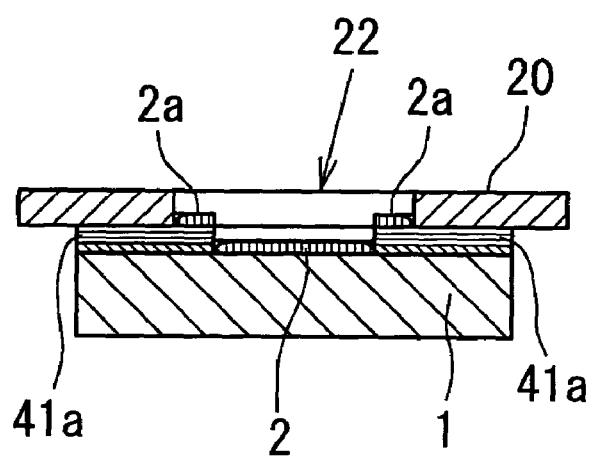
FIG. 13B is a cross-sectional view thereof taken at a line A-A' in FIG. 13A.
Figure 14A:
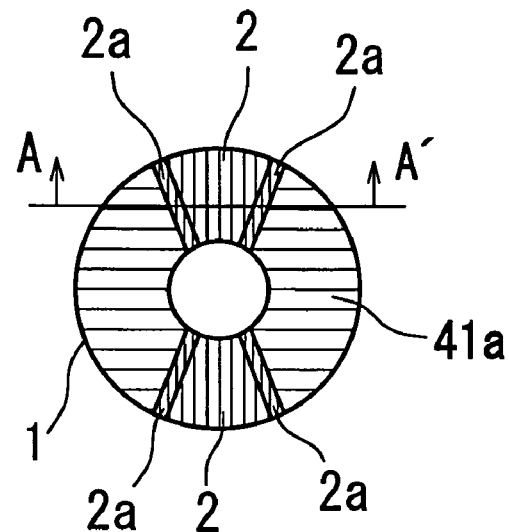
FIG. 14A is a plan view of the color wheel at a process where the metal mask is taken off in the manufacturing method according to the second embodiment.
Figure 14B:
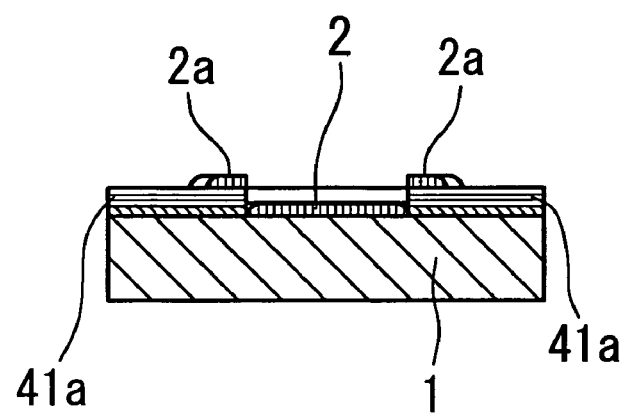
FIG. 14B is a cross-sectional view thereof taken at a line A-A' in FIG. 14A.
Figure 15A:
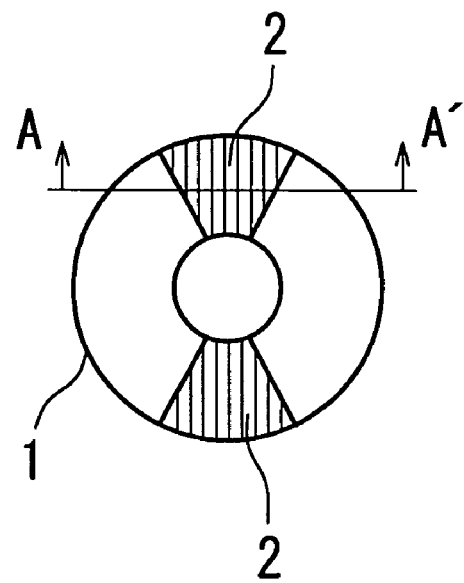
FIG. 15A is a plan view of the color wheel at a process where the chrome thin film and the plating layer constituting the mask pattern is removed in the manufacturing method according to the second embodiment.
Figure 15B:
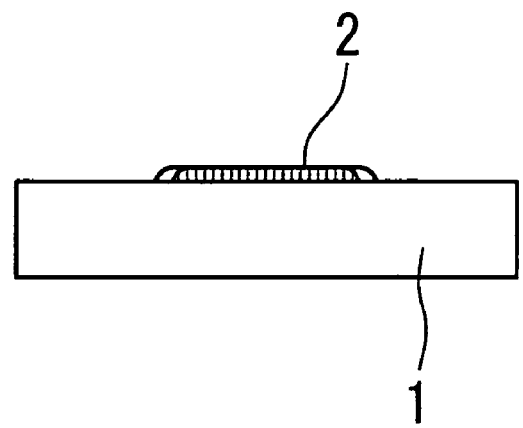
FIG. 15B is a cross-sectional view thereof taken at a line A-A' in FIG. 15A.

Referring then to FIGS. 13A and 13B, predetermined dielectric multi-layer films are formed on the substrate 1 by an evaporation method or a sputtering method, thus (R transmitting) filter sectors 2 are formed entirely at respective film formation regions 12 of the substrate 1, and filters 2a are formed partly on the mask pattern films 41a. Then, the metal mask 20 is taken off (refer to FIGS. 14A and 14B), and an etching solution, for example, a ferric chloride solution is applied to the substrate 1 thereby dissolving and removing the mask pattern films 41a of the mask pattern. At this process, the filters 2a formed on the mask pattern films 41a are lifted off while the filter sectors 2 remain in place on the substrate 1 as shown in FIGS. 15A and 15B.

The above-described process for forming the filter sectors 2 is performed for achieving each of the filter sectors 3 and 4, and the color wheel 10 is completed.

In the second embodiment described above, since dielectric multi-layer film formation is formed with the metal mask 20 placed on the substrate 1, dielectric multi-layer films are formed only at regions exposed through the openings 22 of the metal mask 20 and therefore formed at very limited portions of the mask pattern films 41a bordering on the film formation regions 12 (in this connection, dielectric multi-layer films formed on the metal mask 20 are omitted in FIGS. 13A and 13B). Consequently, in the process of removing the mask pattern films 41a, an etching solution penetrates into the mask pattern films 41a not only from the sidewall portions thereof but also from the most area of the top surfaces thereof thus better dissolving the copper and the chrome forming the mask pattern films 41a.

The thickness of the mask pattern films 41a falls preferably within a range with a lower limit set to such a degree that the dielectric multi-layer films (filter sector 2) formed at the film formation regions 12 are separated from the dielectric multi-layer films formed on the mask pattern films 41a, and with an upper limit set to such a degree that the entrance of particles from an evaporating source is not restricted so much as to cause remarkable disturbance in forming a uniform film at the periphery of the film formation region 12. Specifically, the thickness of the mask film patterns 41a is usually set to measure at about 2 to 10 times the thickness (ranging 1 to 4 µm) of the film constituting at the filter sectors 2. The thickness of the mask pattern films 41a can be controlled by adjusting the plating conditions, such as the composition and the temperature of the plating solution, the plating current density, and the plating time. Also, the electrically conductive thin film as an electrode is formed of chrome, and the plating layer constituting the mask pattern films is a separated-out metal skin of copper in the embodiment, but alternatively any metals or metal compounds that can be duly plated or etched may be optionally used considering the plating and etching conditions.

Figure 16A:
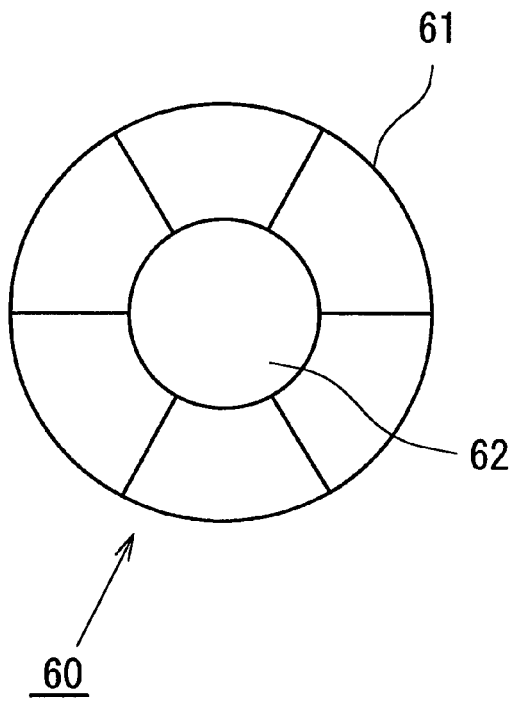
FIG. 16A is front view of a color wheel assembly incorporating the color wheel of FIG. 1 fabricated by one of the manufacturing methods according to the present invention.
Figure 16B:
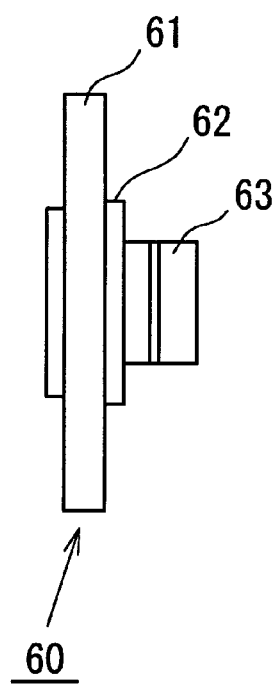
FIG. 16B is a side view thereof.

Now, a description will be made on a color wheel assembly which incorporates a color wheel fabricated according to one of the above-described manufacturing methods of the present invention. Referring to FIGS. 16A and 16B, a color wheel assembly 60 comprises a color wheel 61, a motor 63 to rotate the color wheel 61, and a hub 62 for fixedly attaching the color wheel 61 onto the motor 63 such that the inner circumference of the color wheel 61 is fixed to the hub 62 by means of, for example, adhesive, and that the hub 62 and the motor 63 are fixedly attached to each other adhesively, or mechanically, e.g., screwing. The color wheel 61 may alternatively be fixed directly to the motor 61 without the hub 62, for example, by sharing a common rotary shaft. The filter sectors of the color wheels 61 are formed by one of the above-described manufacturing methods of the present invention, and therefore the filter sectors are aligned to one another with a demarcation accuracy of the mask pattern, for example as accurate as several µm, which is achieved characteristically by the photo-processing.

Further, a discussion will be made on an image display apparatus which includes a color wheel assembly incorporating a color wheel fabricated according to one of the manufacturing methods of the present invention.

Figure 17A:
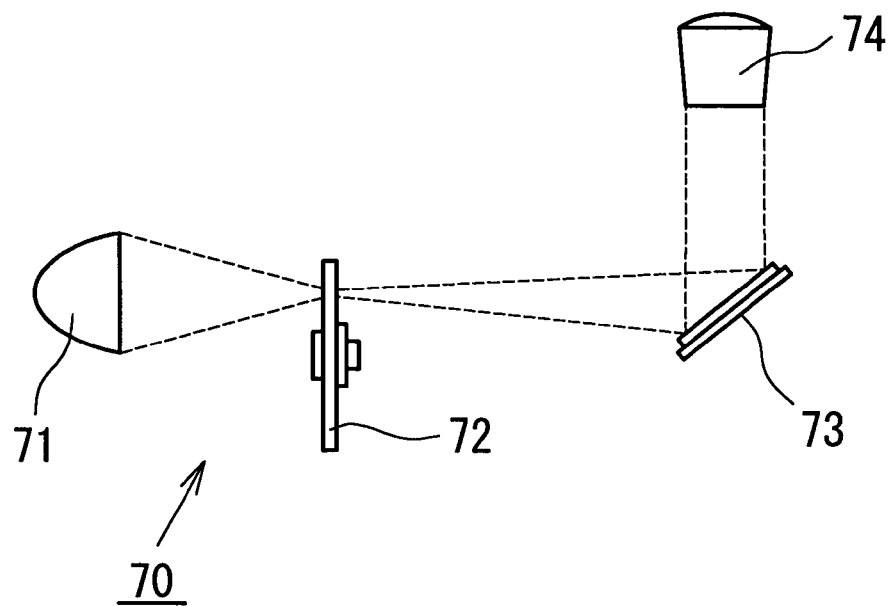
FIG. 17A is a construction view of an image display apparatus including a bicolor color wheel fabricated by one of the manufacturing method according to the present invention.

Referring first to FIG. 17A, an image display apparatus 70 comprises: a white light source 71, such as a metal halide lamp; a color wheel assembly 72; a reflection-type light valve element 73, such as a digital micro mirror device; and a projection lens system 74. In the image display apparatus 70, the color wheel assembly 72 includes a tricolor color wheel which is fabricated according to one of the above-described manufacturing methods of the present invention. White light emitted from the white light source 71 is dispersed by the color wheel assembly 72 sequentially into, for example, R (red) light, G (green) light and B (blue) light, falls incident on the light valve element 73 and is thereby modulated sequentially into R, G and B images which are sequentially projected by the projection lens system 74 to be composed into a full color image.

Figure 17B:
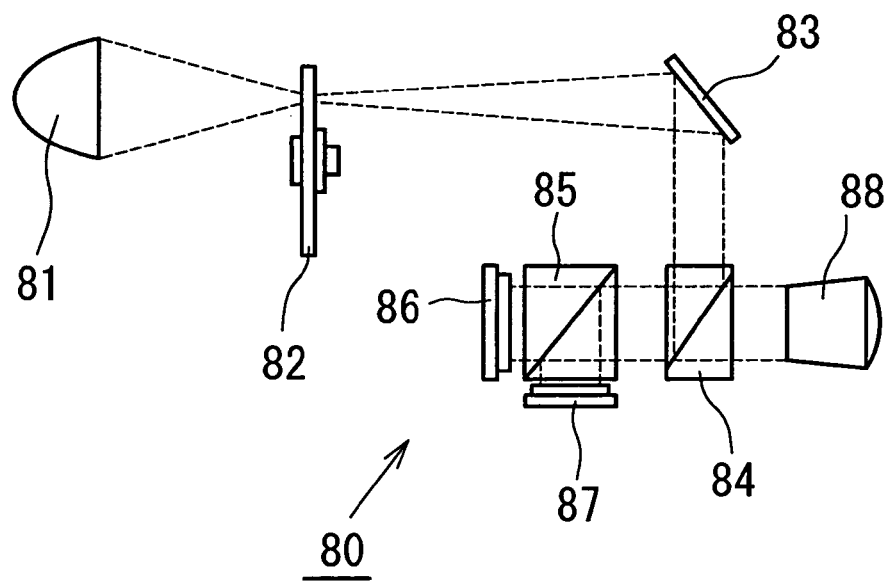
FIG. 17B is a construction view of an image display apparatus including a tricolor color wheel fabricated by one of the manufacturing method according to the present invention.
Figure 18A:
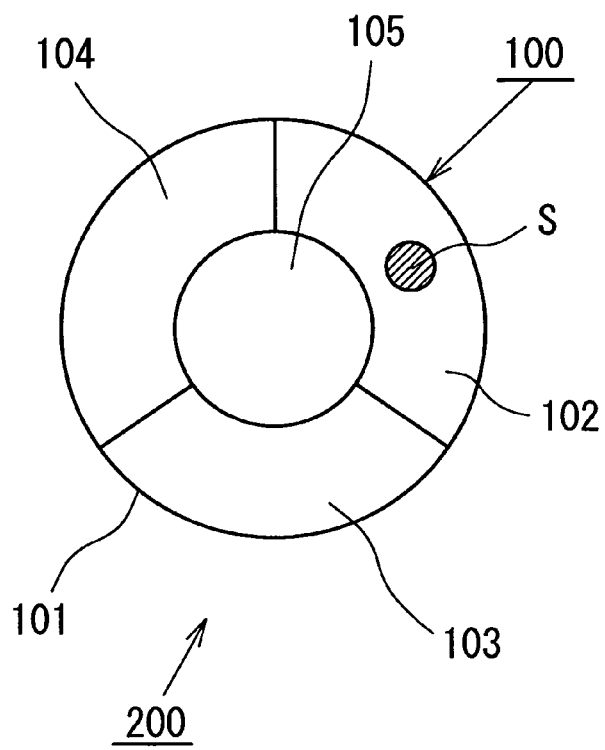
FIG. 18A is a front view of a typical color wheel assembly using a color wheel.
Figure 18B:
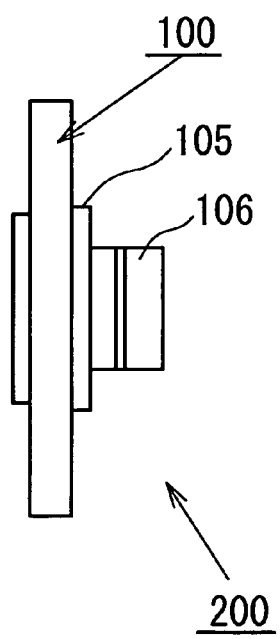
FIG. 18B is a side view thereof.

Referring now to FIG. 17B, an image display apparatus 80 comprises: a white light source 81, such as a metal halide lamp; a color wheel assembly 82; a mirror 83; a total reflection prism 84; a dichroic prism 85; reflection-type light valve elements 86, 87, such as digital micro mirror devices; and a projection lens system 88. In the image display apparatus 80, the color wheel assembly 82 incorporates a bicolor color wheel which is fabricated according to one of the above-described manufacturing methods of the present invention. White light emitted from the white light source 81 is dispersed by the color wheel assembly 82 sequentially into, for example, Y (yellow) light and M (magenta) light, has its travel direction changed by the mirror 83 and the total reflection prism 84, and falls incident on the dichroic prism 85. The dichroic prism 85 is adapted to transmit, for example, R light only, and to reflect light having other wavelength bands, and the Y light incident on the dichroic prism 85 is dispersed thereby into R and G lights falling incident on the light valve element 86 and then the light valve element 87 while the M light incident on the dichroic prism 85 is dispersed into R and B lights falling incident on the light valve element 86 and then the light valve element 87. The light valve element 86 modulates the R light into an R image, and the light valve element 87 modulates the G and B lights into G and B images, respectively. The R and G images, and the R and B images fall incident again on the dichroic prism 85 to be composed thereby into a Y image, and an M image, respectively, and the Y and M images pass through the total reflection prism 84 and are sequentially projected by the projection lens system 88 to be composed into a full color image.

It is evident that those skilled in the art may now make numerous modifications and variations without departing from the inventive concepts. For example, in the aforementioned image display apparatuses 70 and 80, respective light valves 73, and 86 and 87 are of reflection type, but may alternatively be of transmission type, such as liquid crystal light valves. Also, it is obvious that any optical systems or control systems can be optionally employed in the image display apparatuses 70, 80. Consequently, it is to be understood that the present invention is by no means limited to the specific embodiments described above but encompasses all changes and modifications which will become possible within the scope of the appended claims.

What is claimed is:

1. A method for manufacturing a color wheel which comprises a disk-like substrate made of a light-transmittable material, and plural kinds of filter sectors formed on the substrate and functioning either to selectively transmit or to selectively reflect lights having respective different wavelength bands, the method comprising the steps of:

forming, on the substrate, a mask pattern to demarcate predetermined filter sectors of a kind functioning to either transmit or reflect light having a specific wavelength band;

setting, over the substrate having the mask pattern formed thereon, a masking jig which has openings dimensioned slightly larger than the predetermined filter sectors;

forming, on the substrate with the masking jig set thereon, predetermined filters to constitute the predetermined filter sectors;

taking off the masking jig from the substrate having the predetermined filters formed thereon; and removing the mask pattern from the substrate with the masking jig taken off therefrom.

2. A method for manufacturing a color wheel according to claim 1, wherein the step of forming a mask pattern includes: applying photo resist onto the substrate thereby forming a resist film; and shaping the resist film into a negative pattern configured such that the substrate is exposed at regions corresponding to the predetermined filter sectors.

3. A method for manufacturing a color wheel according to claim 1, wherein the step of forming a mask pattern includes: forming an electrically conductive thin film on the substrate; applying photo resist onto the electrically conductive thin film thereby forming a conductive thin film formed on the substrate is exposed except at regions corresponding to the predetermined filter sectors; forming a plating layer on exposed portions of the electrically conductive thin film by an electroplating process conducted by leveraging the electrically conductive thin film as an electrode; removing the resist film; and removing the electrically conductive thin film formed at the regions corresponding to the predetermined filter sectors.

4. A method for manufacturing a color wheel according to claim 1, wherein the step of forming the predetermined filters includes forming dielectric multi-layer films, and wherein the masking jig is fixed to a dielectric multi-layer film forming apparatus whereby the substrate, together with the masking jig, is held inside the apparatus.

5. A color wheel comprising a disk-like substrate made of a light-transmittable material, and plural kinds of filter sectors formed on the substrate and each kind thereof functioning to either transmit or reflect light having a specific wavelength band, wherein the filter sectors are formed by one of the methods according to claim 1.

6. A color wheel according to claim 5, wherein the color wheel, together with a motor for rotating the color wheel, composes a color wheel assembly.

7. A color wheel according to claim 6, wherein the color wheel assembly incorporating the color wheel is employed in an image display apparatus.

8. A method for manufacturing a color wheel according to claim 2, wherein the step of forming the predetermined filters includes forming dielectric multi-layer films, and wherein the masking jig is fixed to a dielectric multi-layer film forming apparatus whereby the substrate, together with the masking jig, is held inside the apparatus.

9. A method for manufacturing a color wheel according to claim 3, wherein the step of forming the predetermined filters includes forming dielectric multi-layer films, and wherein the masking jig is fixed to a dielectric multi-layer film forming apparatus whereby the substrate, together with the masking, is held inside the apparatus.

10. A color wheel comprising a disk-like substrate made of a light-transmittable material, aid plural kinds of filter sectors formed on the substrate and each kind thereof functioning to either transmit or reflect light having a specific wavelength band, wherein the filter sectors are formed by one of the methods according to claim 2.

11. A color wheel comprising a disk-like substrate made of a light-transmittable material, and plural kinds of filter sectors formed on the substrate and each kind thereof functioning to either transmit or reflect light having a specific wavelength band, wherein the filter sectors are formed by one of the methods according to claim 3.

12. A color wheel comprising a disk-like substrate made of a light-transmittable material, and plural kinds of filter sectors formed on the substrate and each kind thereof functioning to either transmit or reflect light having a specific wavelength band, wherein the filter sectors are formed by one of the methods according to claim 4.

* * * * *